United States Patent
Zeng

(10) Patent No.: US 8,504,412 B1
(45) Date of Patent: Aug. 6, 2013

(54) AUDIT AUTOMATION WITH SURVEY AND TEST PLAN

(75) Inventor: Ying Zeng, Fremont, CA (US)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/472,153

(22) Filed: May 15, 2012

(51) Int. Cl.
*G06Q 10/00* (2012.01)

(52) U.S. Cl.
USPC .......................................... 705/7.36

(58) Field of Classification Search
None
See application file for complete search history.

(56) References Cited

U.S. PATENT DOCUMENTS

| | | | |
|---|---|---|---|
| 6,912,502 B1 * | 6/2005 | Buddle et al. ................ | 705/7.41 |
| 7,818,192 B2 * | 10/2010 | Kymal et al. ................ | 705/7.38 |
| 2005/0131781 A1 * | 6/2005 | Benson et al. ................ | 705/30 |
| 2005/0131784 A1 * | 6/2005 | Mamorsky ................ | 705/35 |
| 2006/0089861 A1 * | 4/2006 | King et al. ................ | 705/4 |
| 2006/0106686 A1 * | 5/2006 | King et al. ................ | 705/30 |
| 2006/0241991 A1 * | 10/2006 | Pudhukottai et al. ........... | 705/8 |
| 2006/0242261 A1 * | 10/2006 | Piot et al. ................ | 709/217 |
| 2006/0282276 A1 * | 12/2006 | Venzon et al. ................ | 705/1 |
| 2007/0156495 A1 * | 7/2007 | King ................ | 705/8 |
| 2007/0180490 A1 * | 8/2007 | Renzi et al. ................ | 726/1 |
| 2008/0195436 A1 * | 8/2008 | Whyte ................ | 705/7 |
| 2011/0251930 A1 * | 10/2011 | Yu et al. ................ | 705/30 |
| 2012/0016802 A1 * | 1/2012 | Zeng et al. ................ | 705/317 |
| 2012/0254048 A1 * | 10/2012 | Roberts et al. ................ | 705/317 |
| 2012/0310850 A1 * | 12/2012 | Zeng et al. ................ | 705/317 |

* cited by examiner

*Primary Examiner* — Brett Feeney
(74) *Attorney, Agent, or Firm* — Fountainhead Law Group PC

(57) ABSTRACT

A system automatically executes surveys and control test plans for an audit and consolidates the results for audit issue creation. The system may provide issue remediation workflow. In embodiments, the system allows a user to design an audit, including defining audit task and related surveys and test plans. The user may browse a catalogue of previously defined audit tasks, surveys, and test plans.

20 Claims, 3 Drawing Sheets

AUDIT AUTOMATION WITH SURVEY AND TEST PLAN

CROSS REFERENCE TO RELATED APPLICATION

The present disclosure is related to U.S. application Ser. No. 13/453,187, filed Apr. 23, 2012, entitled "PATTERN BASED AUDIT ISSUE REPORTING", the content of which is incorporated herein by reference in its entirety for all purposes.

BACKGROUND

Unless otherwise indicated herein, the approaches described in this section are not prior art to the claims in this application and are not admitted to be prior art by inclusion in this section.

Audits are common activities in an organization, such as a business enterprise. Audits cover a broad range of practices in the organization, including financial audits, operational systems audits, manufacturing audits, compliance audits, information systems audits, and so on. There are many goals of an audit: add credibility to the financial health of an organization, assure customers of the quality of the goods or services provided by an organization, assure governmental and other regulatory agencies that the organization is in compliance and applicable laws and regulations, and so on. Accordingly, it is important that the quality and reliability of an audit is high.

With ever increasing numbers of rules and regulations being imposed on a business, the workload and responsibilities of an auditing department in a business have significantly increased in recent years. Auditors need to perform several tasks during execution of an audit. Among these tasks, auditors need to send out surveys and control test plans to ensure compliance with rules and regulations that are applicable to the business. Results and responses from the surveys and test plans need to be collected, organized, and then analyzed. In a large organization having many employees and many groups, and having many applicable rules and regulations, the auditing effort can be tremendous. Errors may occur in the distribution of surveys and test plans, and in the collection of results from those surveys and test plans.

In a large organization, different groups in the organization (e.g., business units) may develop their own audit surveys and test plans. In some cases, the same rules and regulations may be applicable to different groups in the organization. It is therefore possible that similar surveys and test plans may be independently developed to conduct audits for compliance with those rules and regulations by the different groups. This duplication of effort represents inefficiency, and can lead to inconsistencies in how audits for the same rules or regulations are handled by different groups within the same organization.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
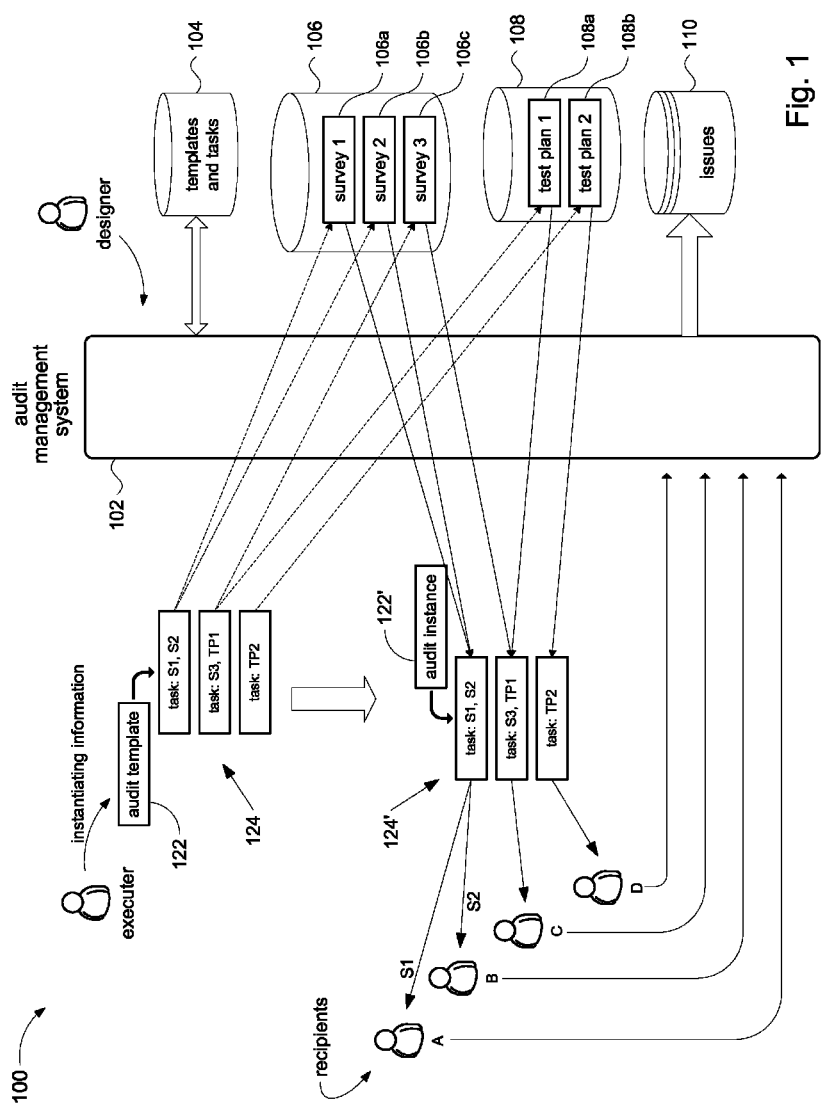
FIG. 1 is a system level diagram of a system in accordance with the present disclosure.

FIG. 1 shows an audit management system 100 for an organization according to principles of the present disclosure. The audit management system 100 may include an audit server 102 and several data stores 104, 106, 108, and 110 to support the audit server. The data stores 104-110 may be implemented as one or more physical storage systems. The data stores 106 and 108 may be collectively referred to as a repository of audit surveys (hereinafter "surveys") and audit test plans (hereinafter "test plans"). An audit templates data store 104 may store "audit templates" and their constituent "audit tasks". As will be explained below, audit templates can automate and facilitate the organization's audit processing activities. A survey data store 106 may contain audit surveys (e.g., 106a, 106b, 106c) that can be used to collect data from people and/or departments within the organization in connection with the organization's audit processing activities. A test plan data store 108 may contain control test plans (e.g., 108a, 108b) to be performed by people and/or departments in connection with the organization's audit processing activities. An audit issues data store 110 may be provided to store issues identified during an audit. The audit management system 100 may resolve audit issues identified during an audit.

As will be explained below, the audit management system 100 may allow a designer to define audit templates (e.g., 122); for example, using a graphical user interface (GUI) on a client system, using web services over an internet connection, and so on. In accordance with the present disclosure, an audit template 122 comprises one or more audit tasks 124. Each audit task 124, in turn, is associated with one or more surveys from the survey database 106 and/or one or more test plans from the test plan database 108.

In accordance with principles of the present disclosure, an audit may be performed when an executer accesses a suitable audit template 122 and provides instantiating information to the audit template. The instantiating information comprises specific information (e.g., timelines, schedules, places, people, etc.) for an audit template and its audit tasks, thus creating an instance of an audit 122' to be performed. Instances of audit tasks 124' may be created by the instantiating information related to the audit tasks and retrieving surveys (106a-106c) and test plans (108a-108b) from the respective data stores 106 and 108. It will be appreciated that, in some embodiments, the designer and the executer may be the same person, and in other embodiments may be different people.

Figure 2:
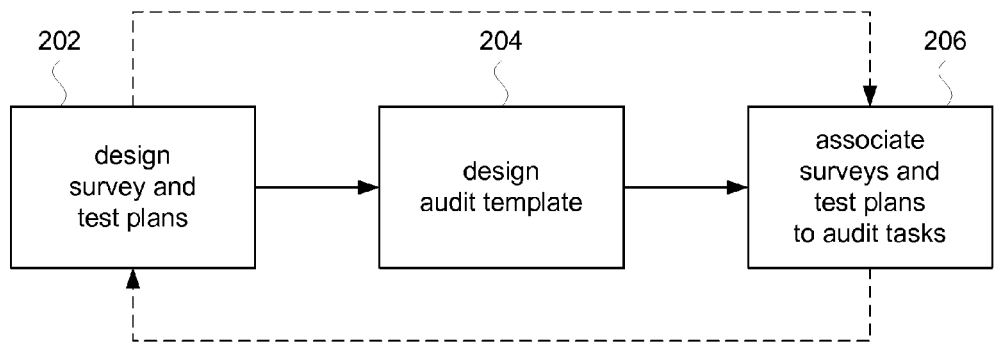
FIG. 2 is a process flow for designing an audits for an organization in accordance with the present disclosure.

Referring to FIG. 2, design time processing in accordance with the present disclosure will be described. The audit server 102 may provide services that allow a designer, in a step 202, to develop audit surveys and develop control test plans for assessing conformance to rules and regulations applicable to the organization. Audit surveys created by the designer may be stored in a data store (e.g., 106) containing a plurality of previously defined audit surveys and, likewise, test plans developed by the designer may be stored in a data store (e.g., 108) containing a plurality of previously defined test plans.

Audit surveys may be used to gather information from people in the organization pertaining to the organization's audit processing activities. A survey may be formulated as a questionnaire, or a multiple choice questionnaire, fill in the blanks, short answers, and so on. A survey may be completed by a single person, or may be completed by a group of people.

Test plans typically specify some sequence of activities to be performed by an individual or a group in connection with establishing conformance with applicable rules and regulations. For example, a test plan may be modeled as a workflow, comprising different parts that can be sent to different people or groups to perform different activities. A test plan may set forth multiple test steps that need to be performed. There may be instructions that explain how to perform a given step. The test plan may specify data samples that need to be collected; e.g., measurements of carbon dioxide emissions from a processing station, or pollutant levels at a discharge pump in a recycling center, and so on.

The surveys and test plans may be catalogued in their respective data stores 106, 108 in any of several ways in order to facilitate identifying and accessing surveys and test plans for a given audit situation. For example, suppose a survey or test plan is designed to assess conformance to some rule or regulation. The survey or test plan may therefore be indexed according to its applicable rule or regulation. Of course, it will be appreciated that the survey or test plan may be indexed or otherwise catalogued according to any other suitable criteria. In this way, the designer has at their disposal a library of predefined surveys and test plans that they can search to facilitate their effort in designing an audit template. If a suitable survey or test plan has already been designed and developed, then the designer can use it. Or, the designer may modify an existing survey or test plan, thus creating a new survey or test plan that can be added to the data store 106 (surveys) or data store 108 (test plans). Or, the designer may create a completely new survey or test plan that can be added to the data store 106 (surveys) or data store 108 (test plans). And so on.

The audit server 102 may facilitate the design of an audit. Thus, in a step 204, a designer (e.g., FIG. 1) may design an audit to be performed. In accordance with principles of the present disclosure, the designer may develop an "audit template" (e.g., 122). The audit template represents a general process for performing the particular audit, but omits the specifics. For example, the audit template for a given audit may designate that the department manager is the contact person for the audit proceeding, but will omit the manager's name. Generally, while the audit template may generally designate people, times, and places, information about specific people, times, and places may be left un-specified.

The designer may build an audit template from scratch, or the designer may search the audit template data store 104 to obtain a predefined audit template and modify or otherwise customize the predefined audit template for their specific auditing needs. The developed audit template may then be stored to the audit template data store 104, thus increasing the repository of predefined audit templates that are available to the organization, allowing for the re-use of audit templates. In some embodiments, the audit templates stored in the audit template data store 104 may be indexed based the rules or regulations they are intended to assess the organization's conformance for, in order to facilitate searching the audit template data store. More generally, the stored audit templates may be indexed or otherwise catalogued based on any other criteria that may be helpful to identify relevant audits.

An audit proceeding can be a complex process. Accordingly, the designer may break down the audit proceeding into manageable pieces referred to as "audit tasks." The designer may define each audit task to be an independent unit, so that it can be performed independently of other audit tasks of the audit. The designer may define one or more audit tasks (e.g., 124) which comprise the audit template. The audit tasks in an audit template may contain certain information that is left un-specified such as specific participants, completion dates, and so on.

In some embodiments, the audit template data store 104 may also include a repository of predefined audit tasks as building blocks for designing audit templates. Audit tasks designed for one audit template may be re-usable in another audit template. Accordingly, the designer may develop their own audit tasks when building an audit template, or they may search the audit template data store 104 of predefined audit tasks to incorporate into their audit template. Any newly created audit tasks may be stored in the audit template data store 104 to increase the repository of predefined audit tasks that designers may choose when designing new audit templates.

In a step 206, the designer may associate one or more surveys or test plans with each audit task of the audit template. For example, the designer may search or otherwise browse the repository of surveys and repository of test plans in order to identify suitable surveys or test plans for the given audit task. In some embodiments, the audit task may simply store references or links to identified surveys or test plans, rather than storing copies of the actual documents corresponding to the surveys or test plans. If the designer does not find a suitable survey or test plan, they may need to design a new survey or test plan. Accordingly, as indicated in the process flow, there may be some iteration between steps 206 and the survey and test plan design step 202.

Figure 3:
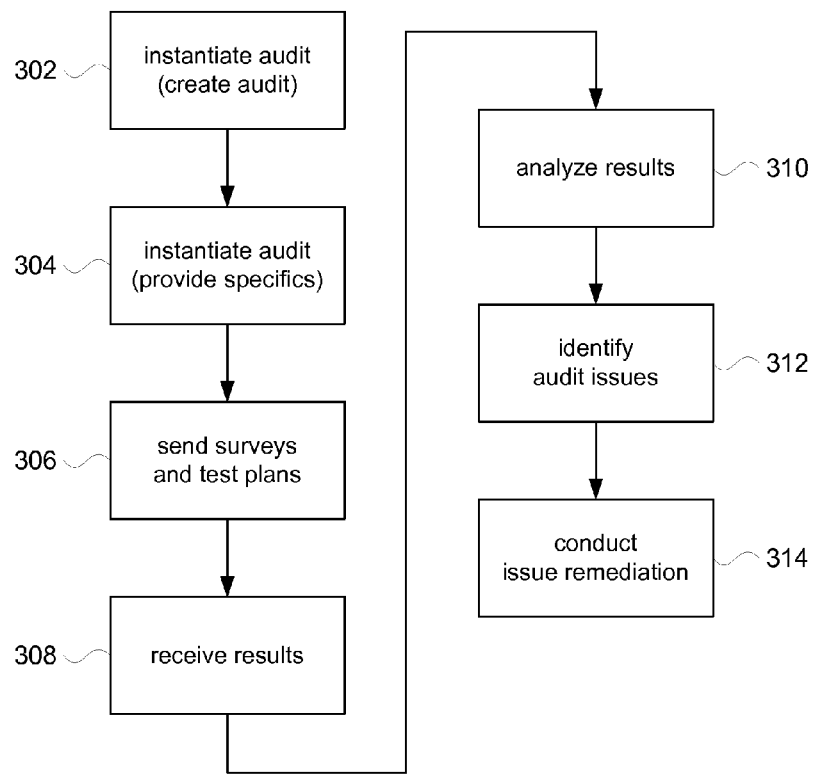
FIG. 3 is a process flow for executing audits.

In accordance with the present disclosure, the audit server 102 coordinates activities relating to the execution of an audit proceeding. The audit template facilitates the automated initiation and execution of an audit proceeding. FIG. 3 illustrates a process flow for automated handling of an audit proceeding in accordance with principles of the present disclosure. An executer (e.g., FIG. 1) may instantiate (steps 302 and 304) an audit to be performed. Thus, in step 302, the executer may begin the process by selecting an audit template (e.g., 122, FIG. 1) from the audit template data store 104 that is suitable for the audit proceeding. As explained above, the audit templates may be indexed or other catalogued in order to facilitate searching for a suitable audit template. Accordingly, the audit server 102 may provide a suitable interface and/or search engine that the executer can use to search the audit template data store 104.

In some embodiments, the audit server 102 may automatically process each audit task comprising the selected audit template including retrieving the surveys or test plans identified in the audit tasks. As explained above, each audit task identifies the surveys or test plans needed to perform the specific task. In step 302, the audit server 102 may retrieve copies of the actual documents that correspond to the surveys or test plans associated with each audit task, thus creating from the audit template a specific instance of the audit (e.g., 122', FIG. 1) to be performed.

In a step 304, the executer may identify specific people, times, and places called for in the audit template and fill in the un-specified details in the audit template to further instantiate the audit to be performed. For example, the executer may identify recipients of the surveys and test plans associated with the audit tasks that comprise the audit.

In some embodiments, the processing of step 304 may be largely automated by the audit server 102. The audit server 102 may identify the needed information using the audit template and providing that information to instantiate the audit. For example, in some embodiments, the audit template may include or otherwise be associated with metadata that the audit server 102 can read. The metadata may identify various actors in the audit by their roles in the organization. For example, there may be metadata in the audit template that indicates "Manager of Manufacturing". The audit server 102 may read in that metadata and can identify the manager, for example, by accessing the organization's personnel database. It can be understood therefore that the metadata may be used to guide the audit server 102 in generating the specific information needed to instantiate the audit. In some embodiments, the results produced by the audit server 102 may be subject to review by the executer or other actual person, for example, for to verify the accuracy and propriety of the choices made by the audit server.

After the audit has been instantiated from the selected audit template, the executer may initiate automated execution of the audit process by the audit server 102. In a step 306, the audit server 102 may conduct the audit proceeding by sending out the survey documents and test plan documents to the recipients identified in step 304. For example, the audit server 102 may send emails to the recipients and include the documents as attachments in the emails. It will be appreciated of course that the audit server 102 may deliver the surveys and test plans to respective recipients in any suitable manner such as by mailing the surveys or test plans to the recipient, signaling people in the Office Services department to deliver the materials, and so on.

The surveys and test plans in an instantiated audit task (e.g., 124') may be sent to one or more recipients. Referring for a moment to FIG. 1, for example, an audit task instance 124' comprising survey S1 and survey S2 is handled by two recipients, A and B. The audit task instance comprising survey S3 and test plan TP1, on the other hand, is handle by a single recipient C. And the audit task instance comprising only test plan TP2 is also handled by a single recipient D. It can be appreciated of course that other combinations of audit tasks/recipients are possible.

In a step 308, the audit server 102 may monitor the progress of the audit proceeding. In some embodiments, responses to the surveys and test plans may be communicated to the audit server 102. Surveys typically require responses from the recipients. Responses may be written down or otherwise indicated on the survey documents themselves. Recipients may scan the responses (e.g., into a PDF document) and email the responses as an attachment to an email address that the audit server 102 monitors. Recipients may simply return the physical documents (e.g., by interoffice mail), where a processing person may then scan it into the audit server 102. Responses to a test plan may include the recording of information obtained during the processing of the test plan. If no data is gathered, a signature or some form or express indication that the test plan was performed may be provided by the recipient of the test plan, their manager, etc., indicating that the test plan was executed.

In embodiments, the audit tasks comprising an audit may be conducted independently of each other. The audit server 102 may track the progress of each audit task as results from completed surveys and test plans are received. When all the surveys and test plans for a given audit task have been received, the audit server 102 may indicate the given audit task as having been completed. In some embodiments, if a completed survey or test plan for an audit task has not been received after a given period of time, the audit server 102 may make note of the fact and designate the missing survey or test plan as having been "constructively" received for the purpose of tracking when the completion status of the audit task. Similarly, the audit server 102 may receive an partially completed survey or test plan. The audit server 102 may then allow for a certain period of time to during which to receive the remaining portion of the survey or test plan. After passage of that certain period of time, the audit management system may consider the partially completed survey or test plan to be complete for the purpose of tracking the completion status of the audit task.

When execution of all the audit tasks comprising an audit has concluded (i.e., when all the audit tasks have been deemed to be completed), then in a step 310 the audit server 102 may analyze the results of the audit. For example, the responses given to the surveys and test plans may be reviewed. In a step 312, audit issues may be identified among the responses. In a step 314, various remediation workflows may be triggered based on the audit issues identified in step 312. The remediation workflows may be assigned to be performed by appropriate people in the organization. Results from the remediation workflow may be reviewed and the process may continue until the audit issues have been resolved. In some embodiments, these steps may be automated by the audit server 102. A system for automated processing of an audit proceeding is disclosed in commonly owned U.S. Application No. 13/453,187, filed Apr. 23, 2012, entitled "PATTERN BASED AUDIT ISSUE REPORTING". It will be appreciated of course that any other audit issue handling methodology or system may be used.

Figure 4:
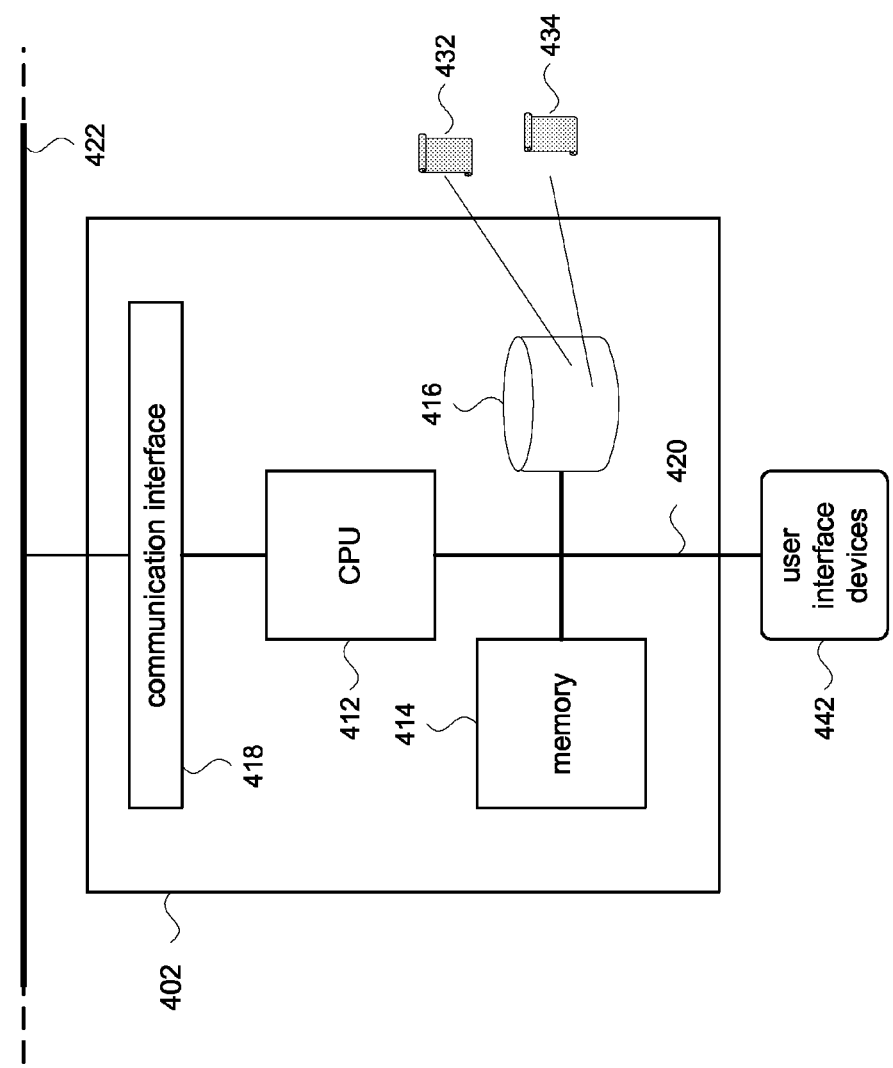
FIG. 4 is a high level system diagram of an audit server in accordance with the present disclosure.

A particular embodiment of the audit server 102 in accordance with the present disclosure is illustrated in FIG. 4, showing a high level block diagram of a computer system 402 configured to operate in accordance with the present disclosure. The computer system 402 may include a central processing unit (CPU) or other similar data processing component. The computer system 402 may include various memory components. For example, the memory components may include a volatile memory 414 (e.g., random access memory, RAM) and a data storage device 416. A communication interface 418 may be provided to allow the computer system 402 to communicate over a communication network 422, such as a local area network (LAN), the Internet, and so on. An internal bus 420 may interconnect the components comprising the computer system 402.

The data storage device 416 may comprise a non-transitory computer readable medium having stored thereon computer executable program code 432. The computer executable program code 432 may be executed by the CPU 412 to cause the CPU to perform steps of the present disclosure, for example the steps set forth in FIGS. 2 and 3. The data storage device 416 may store data structures 434 such as object instance data, runtime objects, and any other data described herein. In some embodiments, the data structures 434 may include audit templates, audit tasks, surveys, test plans, and so on.

A user (e.g., designer or executer, FIG. 1) may interact with the computer system 402 using suitable user interface devices 442. They may include, for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Advantages and Technical Effect

The foregoing has disclosed an automatic execution of surveys and control test plans during for an audit proceeding, and to consolidate the results for audit issue creation. Users can re-use the surveys and control test plans defined by internal control departments within the organization. Audit tasks may be mapped to surveys and test plan data. Audit templates support automated audit execution at runtime. Audit issue detection and issue remediation workflow are facilitated. Embodiments in accordance with the present disclosure can greatly simplify the tasks auditors need to perform during an audit execution and reduce the manual efforts for auditors. Embodiments can greatly improve the accuracy and the quality of the audit process.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer implemented method for conducting an audit in an organization comprising:
    a computer system creating a first audit to be executed including:
        receiving a first audit template from among a plurality of audit templates, the first audit template comprising a plurality of audit tasks, each audit task associated with one or more surveys or test plans; and
        instantiating the first audit by identifying a plurality of survey and test plan documents from the first audit template including, for each audit task in the first audit template, identifying documents corresponding to the surveys or test plans associated with said each audit task;
    the computer system identifying one or more recipients using metadata associated with the audit template;
    the computer system executing the first audit including:
        sending the identified survey and test plan documents to the one or more recipients; and
        receiving results from recipients who respond to the identified survey and test plan documents;
        monitoring progress of the first audit based on who has and has not responded to the identified survey and test plan documents.

2. The method of claim 1 wherein each audit task of the first audit is executed independently of other audit tasks of the first audit.

3. The method of claim 1 further comprising receiving input from a user identifying the one or more recipients to whom each survey or test plan comprising the audit task is associated.

4. The method of claim 1 wherein recipients include people in the organization and groups in the organization.

5. The method of claim 1 further comprising creating a new audit template including:
    defining one or more audit tasks;
    for each audit task associating one or more surveys or test plans to the audit task; and
    storing the new audit template among the plurality of audit templates.

6. The method of claim 5 wherein defining one or more audit tasks includes selecting an audit task from among a plurality of predefined audit tasks.

7. The method of claim 5 further comprising defining one or more surveys or test plans.

8. A system for conducting an audit in an organization comprising:
    a central processing unit;
    a memory; and
    a data storage system having stored thereon a plurality of audit templates, a plurality of audit survey documents, and a plurality of audit test plan documents;
    the memory having stored thereon executable program code, which when executed by the central processing unit, causes the central processing unit to:
    create a first audit to be executed including:
        receiving a first audit template from among the plurality of audit templates, the first audit template comprising a plurality of audit tasks, each audit task associated with one or more audit surveys or audit test plans; and
        instantiating the first audit by identifying a plurality of survey and test plan documents from the first audit template including, for each audit task in the first audit template, identifying documents corresponding to the audit surveys or audit test plans associated with said each audit task;
    identify one or more recipients using metadata associated with the audit template;
    execute the first audit including:
        sending the survey and test plan documents to one or more recipients; and
        receiving results from recipients who respond to the survey and test plan documents;
        monitoring progress of the first audit based on who has and has not responded to the identified survey and test plan documents.

9. The system of claim 8 wherein each audit task of the first audit is executed independently of other audit tasks of the first audit.

10. The system of claim 8 wherein the executable program code, which when executed by the central processing unit, further causes the central processing unit to receive input from a user identifying the one or more recipients to whom each audit survey or audit test plan comprising the audit task is associated.

11. The system of claim 8 wherein recipients include people in the organization and groups in the organization.

12. The system of claim 8 wherein the executable program code, which when executed by the central processing unit, further causes the central processing unit to create a new audit template including:
    defining one or more audit tasks;
    for each audit task associating one or more audit surveys or audit test plans to the audit task; and
    storing the new audit template among the plurality of audit templates.

13. The system of claim 12 wherein defining one or more audit tasks includes selecting an audit task from among a plurality of predefined audit tasks.

14. The system of claim 12 wherein the executable program code, which when executed by the central processing unit, further causes the central processing unit to define one or more audit surveys or audit test plans.

15. A non-transitory computer readable storage medium having stored thereon computer executable program code configured to cause a computer system to perform steps of:
   creating a first audit to be executed including:
      receiving a first audit template from among a plurality of audit templates, the first audit template comprising a plurality of audit tasks, each audit task associated with one or more surveys or test plans; and
      instantiating the first audit by identifying a plurality of survey and test plan documents from the first audit template including, for each audit task in the first audit template, identifying documents corresponding to the surveys or test plans from a repository of predefined surveys and test plans associated with said each audit task;
   identify one or more recipients using metadata associated with the audit template;
   executing the first audit including:
      sending the survey and test plan documents to one or more recipients; and
      receiving results from recipients who respond to the survey and test plan documents;
   monitoring progress of the first audit based on who has and has not responded to the identified survey and test plan documents.

16. The non-transitory computer readable storage medium of claim 15 wherein each audit task of the first audit is executed independently of other audit tasks of the first audit.

17. The non-transitory computer readable storage medium of claim 15 wherein the computer executable program code is further configured to cause the computer system to receive input from a user identifying the one or more recipients to whom each survey or test plan comprising the audit task is associated.

18. The non-transitory computer readable storage medium of claim 15 wherein the computer executable program code is further configured to cause the computer system to create a new audit template including:
   defining one or more audit tasks;
   for each audit task associating one or more surveys or test plans to the audit task; and
   storing the new audit template among the plurality of audit templates.

19. The non-transitory computer readable storage medium of claim 18 wherein defining one or more audit tasks includes selecting an audit task from among a plurality of predefined audit tasks.

20. The non-transitory computer readable storage medium of claim 18 wherein the computer executable program code is further configured to cause the computer system to define one or more surveys or test plans.

* * * * *